United States Patent [19]

Kirimoto et al.

[11] Patent Number: 5,622,083
[45] Date of Patent: Apr. 22, 1997

[54] GEAR SHIFTING MECHANISM

[75] Inventors: Kanji Kirimoto, Kaizuka; Mitsuo Oka, Sakai, both of Japan

[73] Assignee: Shimano Inc., Osaka, Japan

[21] Appl. No.: 595,540

[22] Filed: Feb. 2, 1996

[51] Int. Cl.⁶ .............. G05G 5/06; B62K 23/06; F16H 63/38
[52] U.S. Cl. .............. 74/475; 74/489; 74/502.2; 74/527
[58] Field of Search .............. 74/475, 489, 527, 74/502.2

[56] References Cited

U.S. PATENT DOCUMENTS

| | | | |
|---|---|---|---|
| 4,155,270 | 5/1979 | Juy | 74/475 |
| 4,504,250 | 3/1985 | Juy | 474/80 |
| 4,676,118 | 6/1987 | Leiter | 74/527 X |
| 4,731,046 | 3/1988 | Juy | 474/80 |
| 4,876,913 | 10/1989 | Romano | 74/475 X |
| 5,190,390 | 3/1993 | Ming-Tai | 74/527 X |
| 5,524,501 | 6/1996 | Patterson et al. | 74/475 |

*Primary Examiner*—Allan D. Herrmann
*Attorney, Agent, or Firm*—Shinjyu Office of Patent Attorneys

[57] ABSTRACT

The present invention includes a disk shaped base member which has a notched central aperture extending therethrough and a cable shield retaining portion. A shaft member is formed with notched ends, one end of the shaft member extending thought the notched central aperture. A gear member is formed with gear teeth on an inner circumferencial surface and a notched central aperture. The other end of the shaft member extends into the gear member notched central aperture and is fixed thereto. The gear member and the base member confine a lever handle therebetween, but allow the lever handle to rotate. A pawl member retained within a recess in the lever handle, engages the gear teeth on the gear member restricting movement of the lever handle to predetermined arcuate steps.

8 Claims, 4 Drawing Sheets

GEAR SHIFTING MECHANISM

BACKGROUND OF THE INVENTION

A. Field of the Invention

The invention relates to a gear shifting mechanism having a lever arm, and a pawl member in engagement with a geared member with gear teeth for limiting movement of the lever arm to incremental step-wise movement.

B. Description of the Related Art

Multiple speed bicycles have become very common recently. Multiple speed bicycles include, for instance, racing bicycles, street bicycles and mountain bicycles. Multiple speed bicycles typically have at least one gear derailleur and the lever mechanism for manipulating the gear derailleur. It should be understood that there are also multiple speed bicycles having gear changing mechanisms that use mechanisms other that a gear derailleur for changing a gear ratio on the bicycle.

The lever mechanism for effecting the change of the gear ratio on a bicycle is often referred to as a gear shifting mechanism. One gear shifting mechanism includes a lever arm supported for pivotal movement on a base attached to a bicycle frame. The lever arm attaches to a cable, the cable being connected to a gear derailleur or similar gear ratio changing mechanism. The lever arm is moved by a bicyclist to an approximate position thus moving the cable and correspondingly moving the gear ratio changing mechanism. The lever arm is moved to a position corresponding to the desired gear ratio. The lever arm movement is restricted by, for instance, friction which is great enough to keep the lever arm in position, but not so great as to prevent a user from easily changing gear ratios. The positioning of the lever arm to change gears is not precise.

In recent years, however, gear shifting mechanisms have developed into precision mechanisms configured to allow the lever arm to lock into a plurality of positions, each position corresponding to a gear ratio in accordance with the gear changing characteristics of a gear derailleur or similar gear ratio changing mechanism. For instance, in FIG. 1, a prior art gear changing mechanism 1 is shown.

In the prior art gear changing mechanism 1, a base (not shown) attaches the gear changing mechanism to the frame or handlebar of a bicycle (not shown) or to a brake lever mechanism on the handlebar of a bicycle (not shown). The base (not shown) connects to a disk member 2. The disk member 2 is formed with a cable shield retainer 2a which engages and holds the cable shield (not shown) through which an inner cable extends.

A shaft member 3 attaches to the disk member 2 via pins 3a which extend through holes 2b in the disk member 2. The pins 3a may be spot welded to the plate member 2 or punched so that they are deformed within the holes 2b. The shaft member 3 is formed with an indented shaft 3b having threads 3c formed on an outer periphery thereof.

A handle 4 is formed with a lever arm 5, a central bore 4a, protrusions 4b and a cable retainer hole 4c. The indented shaft 3b extends through the central bore 4a when the mechanism 1 is fully assembled. A positioning disk 6 is formed with two opposing indents 6a, a plurality of opposing recesses 6b and a central bore 6c. The indented shaft 3b extends through the bore 6c when the mechanism 1 is fully assembled. The indents 6a fit around the protrusions 4b when the mechanism 1 is fully assembled. A fixed plate 7 is formed with an indented central aperture 7b and two ball holes 7a. One ball 8 is disposed in each of the ball holes 7a. The diameter of the balls 8 is greater than the thickness of the fixed plate 7. A retainer plate 9 is also formed with an indented central bore 9a through which the indented shaft 3b extends. The retainer plate 9 is also formed with two ball confining protrusions 9b positioned to retain the balls 8 in the holes 7a in engagement with the positioning disk 6. A threaded nut 10 screws on to the indented shaft 3b to hold the mechanism 1 together. In usage, a cable (not shown) would extend through the hole 2c in the cable shield retainer 2a and extend through the cable retainer hole 4c.

Movement of the lever arm 5 causes the cable (not shown) to move. When fully assembled, the mechanism 1 allows the lever arm 5 to be rotated about the shaft member 3. The positioning disk 6 rotates with the lever arm 5 due to the engagement of the protrusions 4b with the two opposing indents 6a. However, the central bores 7b and 9a are confined by the indented shaft 3b such that they cannot rotate with respect to the shaft member 3. As the lever arm 5 is rotated, the positioning disk 6 is rotated therewith, but the balls 8 are confined to engage the surface of the positioning disk 6 by the holes 7a and the ball confining protrusions 9b. The balls 8 are able to engage and extend into any of the recesses 6b. When the balls 8 are engaged in one pair of opposing recesses 6b, the lever arm 5 is locked gently into a predetermined position.

The lever arm 5 is confined to incremental step-wise movement about the shaft member 3 by the interaction of balls 8 with the recesses 6b. In this manner the lever arm 5 may control the shifting of gears on a bicycle.

There are several disadvantages to the above design, shown in FIG. 1. One disadvantage is that there are a large number of parts making manufacturing expensive. Another disadvantage is that several of the parts in the design shown in FIG. 1 require fine machine working during manufacturing. For instance, a portion of the shaft must be indented and must have threads formed thereon. Further, each of the plates 7 and 9 is formed with a non-circular bore which is also formed using relatively expensive manufacturing procedures.

SUMMARY OF THE INVENTION

Accordingly, it is one object of the present invention to attempt to reduce the number of parts necessary in a gear shifting mechanism.

Another object of the present invention is to minimize the cost of manufacturing of a gear shifting mechanism.

In one aspect of the present invention, a gear shifting mechanism includes a base member having a cable shield retaining portion. A lever handle is formed with a central aperture, a support portion and a pawl retaining recess. A shaft member is disposed in the central aperture and is fixed to the base member. A gear member has a disk-like shape and a generally hollow interior having an inner circumferential surface with gear teeth is formed thereon. The gear member is fixed to the shaft member. A pawl member is disposed in the pawl retaining recess for engagement with the gear teeth.

Preferably, the lever handle is formed from a plastic material.

Preferably, the shaft member is made from plate steel deformed to form a hollow shaft.

Preferably, the gear member is formed from a steel plate material that is pressed to form the disk-like shape and the gear teeth.

Preferably, the pawl member is formed of a plastic material.

Preferably, the gear member and the base member confine the lever handle therebetween and permit the lever handle to rotate about the shaft member.

Preferably, the pawl member confines the lever handle to predetermined incremental movement about the shaft member.

These and other objects, features, aspects and advantages of the present invention will become more fully apparent from the following detailed description of the present invention when taken in conjunction with the accompanying drawings where like reference numerals denote corresponding parts throughout, in which:

DETAILED DESCRIPTION OF TEE PREFERRED EMBODIMENT

Figure 2:
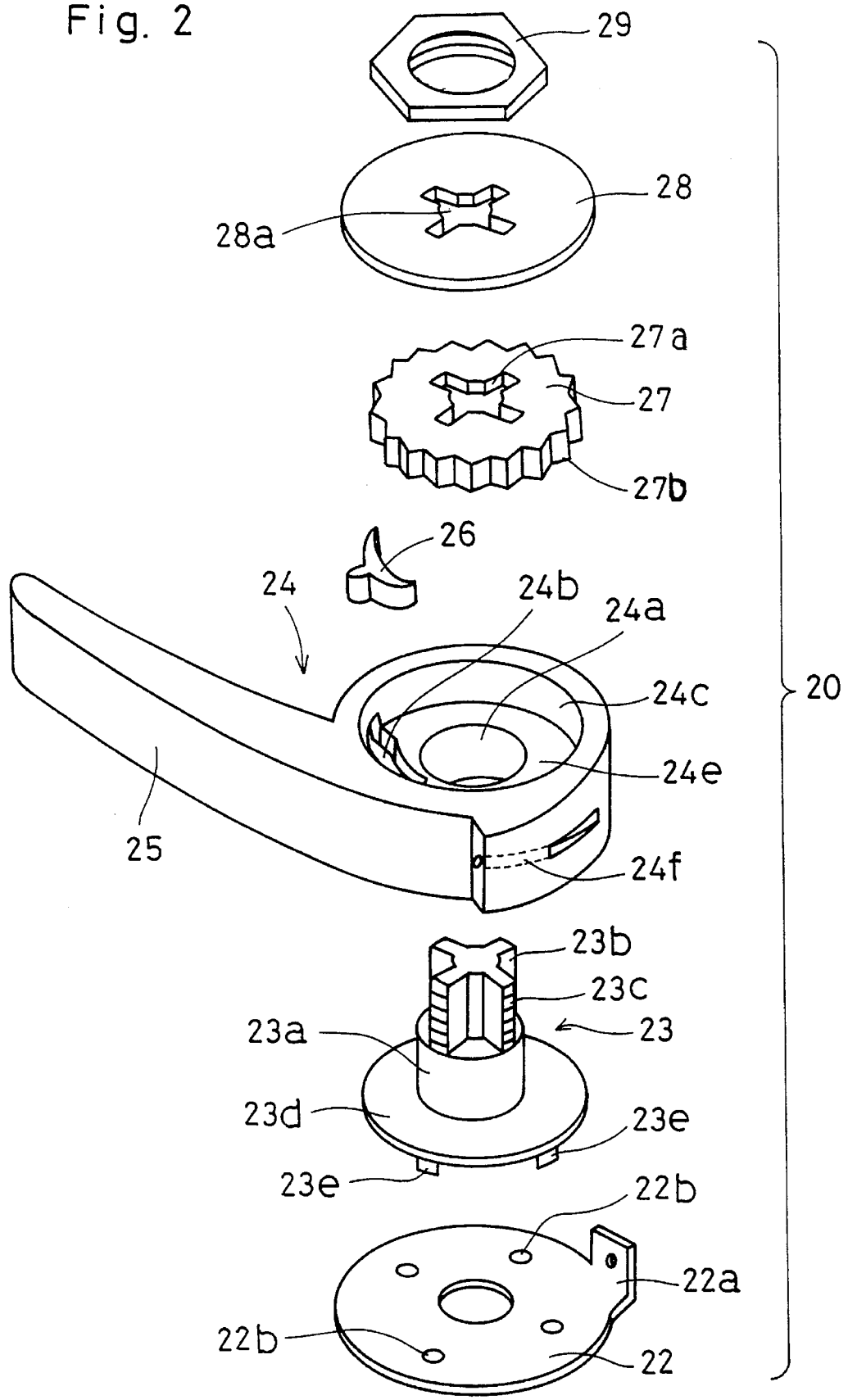
FIG. 2 is an exploded view of another configuration of a gear shifting mechanism.

With reference to FIG. 2, a bicycle gear changing mechanism 20 is shown. The gear changing mechanism 20 includes a disk member 22 which is formed with a cable shield retaining portion 22a and a plurality of holes 22b. The disk member 22 may be attached to a bicycle handlebar (not shown) or may be attached to a bicycle brake lever arm mechanism (not shown) that is attached to the bicycle handlebar (not shown).

A shaft member 23 is formed with a shaft portion 23a, an indented shaft portion 23b having threads 23c formed thereon, and a disk shaped base portion 23d. The base portion 23d has pins 23e formed thereon. The shaft member 23 attaches to the disk member 22 via the pins 23e. The pins 23e extend into the holes 22b and may be, for instance, deformed or welded to fix the shaft member 23 to the disk member 22.

A handle 24 includes a lever arm 25, a central bore 24a, a pawl recess 24b formed in an annular recess 24c. The annular recess 24c includes an axial face 24e through which the central bore 24a extends. The handle 24 is also formed with a cable retaining hole 24f. The handle 24 is supported on the shaft member 23. Specifically, the shaft portion 23a and the indented shaft portion 23b extend through the central bore 24a such that the handle 24 is supported on the shaft portion 23a of the shaft member 23.

A pawl member 26 is disposed within the pawl recess 24b. A gear member 27 is disposed within the annular recess 24c and engages the pawl member 26. The gear member 27 is formed with a central intended hole 27a such that the indented shaft portion 23b of the shaft member 23 extends through the central indented hole 27a preventing the gear 27 from rotating with respect to the shaft member 23 and the disk member 22. The gear member 27 is formed with gear teeth 27b on an outer circumferential periphery thereof.

A retaining plate 28 is formed with a central indented aperture 28a. The retaining plate 28 is supported on the shaft member 23 such that the indented shaft portion 23b extends through the indented aperture 28a of the retaining plate 28 thus preventing rotation of the retaining plate 28 with respect to the shaft member 23. A nut 29 threads onto the threads 23c of the shaft member 23 to secure the retaining plate 29 and the gear 27 to the shaft member 23. Further, the nut 29 and the retainer plate 29 retain the handle 24 on the shaft member 23, but allow the handle 24 and lever arm 25 to rotate on the shaft portion 23a of the shaft member 23.

When installed on a bicycle, the gear changing mechanism 20 allows for movement of a cable (not shown) in predetermined incremental steps based upon the size and shape of the gear teeth 27b and engagement of the gear teeth 27b with the pawl member 26.

Figure 3:
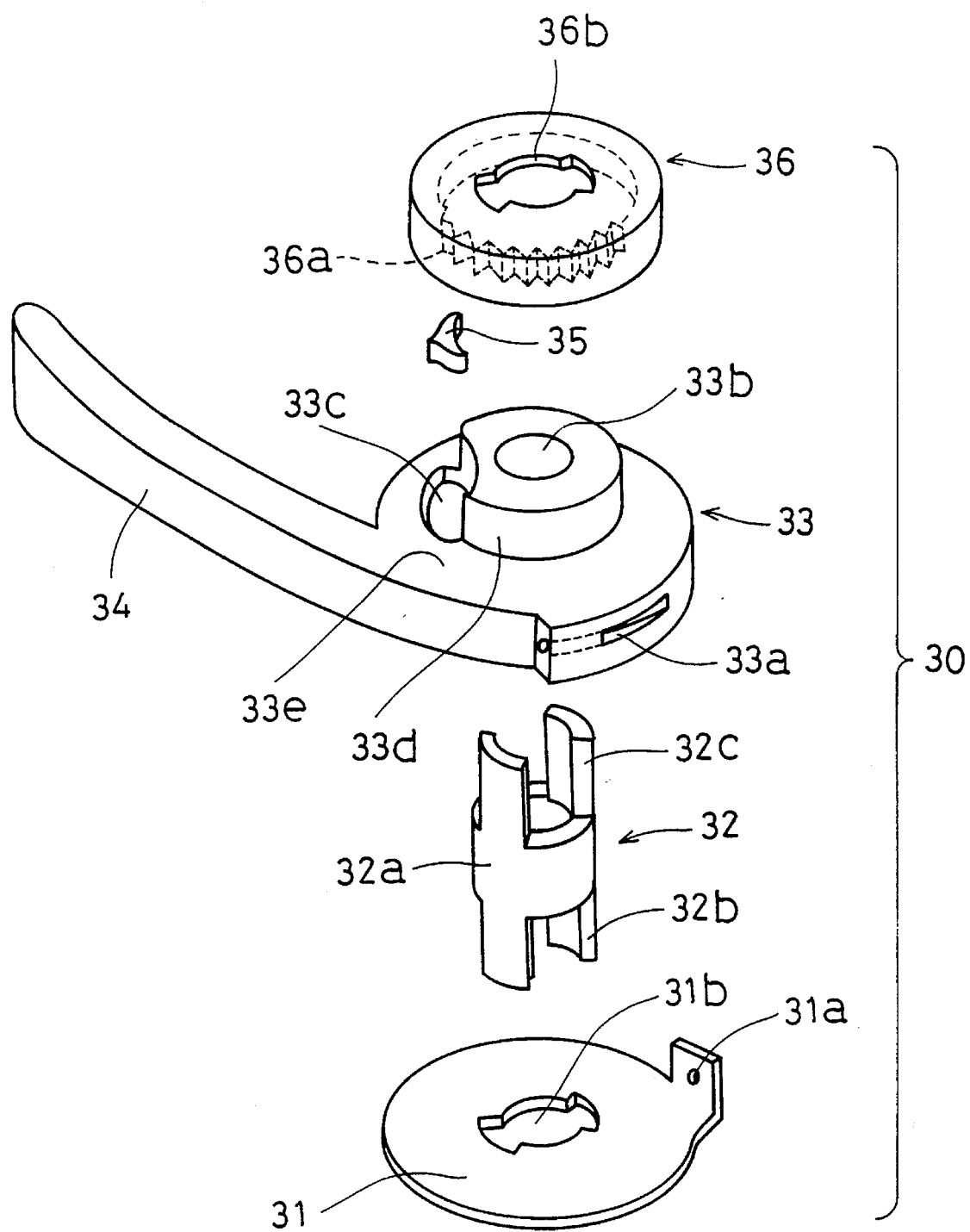
FIG. 3 is an exploded view of a gear shifting mechanism in accordance with the present invention.
Figure 4:
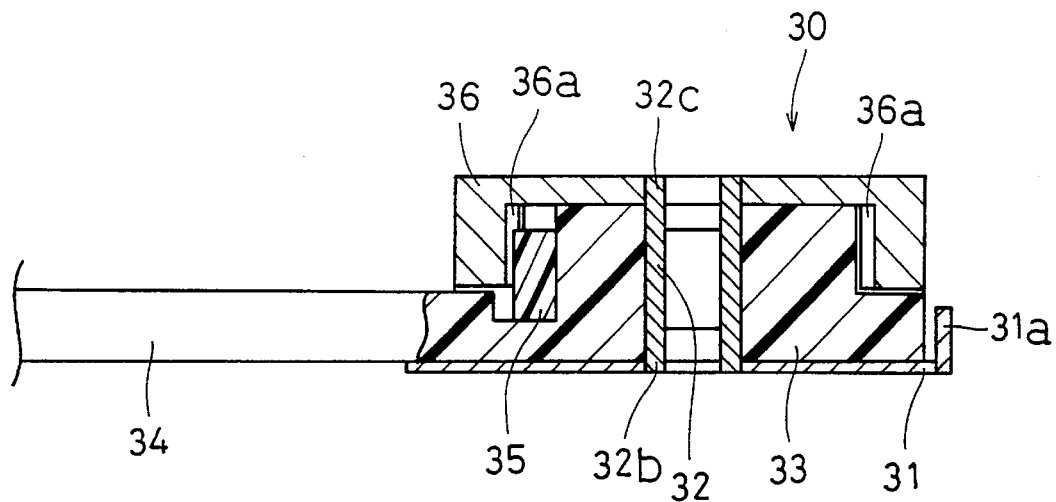
FIG. 4 is a side cross-section of the gear shifting mechanism depicted in FIG. 3.
Figure 5:
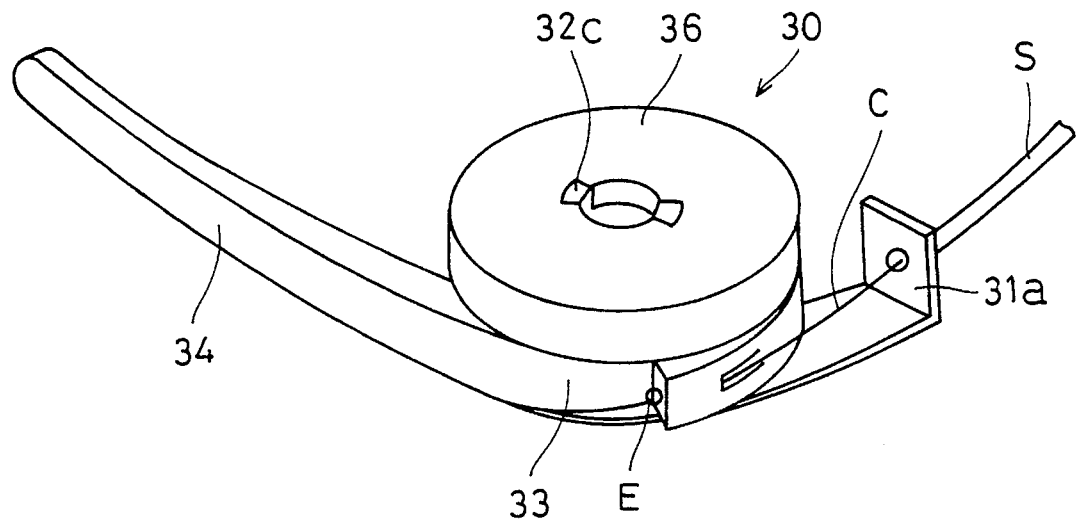
FIG. 5 is a fragmentary perspective view of the gear shifting mechanism depicted in FIGS. 3 and 4.

FIGS. 3, 4 and 5 show a gear changing mechanism 30 in accordance with one embodiment of the present invention. With reference to FIG. 3, the gear changing mechanism 30 includes a disk member 31 formed with a cable shield retaining portion 31a and a central indented bore 31b. A shaft member 32 is formed with a central shaft portion 32a, a lower notched shaft portion 32b and an upper notched shaft portion 32c. The lower notched shaft portion 32b is shaped to conform to the shape of the central indented bore 31b in the disk member 31. When assembled, as shown in cross-section in FIG. 4, the lower notched shaft portion 32b extends into the central indented bore 31b.

The shaft member 32 is preferably manufactured from metal. In particular, the shaft member 32 is made of rolled steel plate material. However it should be understood that non-ferrous metals could be used and further, the shaft member 32 could also be manufactured from a higher grade steel and machined to form the shaft shape shown in FIGS. 3 and 4.

The lower notched shaft portion 32b is fixed to the disk member 31 by any of a variety of means. For instance, once inserted into the central indented bore 31b, the lower notched shaft portion 32b may be punched or deformed to restrain axial movement of the shaft member 32 with respect to the disk member 31. Alternatively, the shaft member 32 may be welded to the disk member 31. Further, the shaft member may also be press-fitted into the disk member 31. The shaft member 32 may alternatively be made of a non-metallic material, in which case the shaft member 32 may be glued or cemented to the disk member 31.

With reference again to FIG. 3, a handle 33 is formed with a lever arm 34. The handle 33 is formed with a cable retaining hole 33a. A central bore 33b extends through the handle 33. Extending from the handle and concentric with the central bore 33b is a generally cylindric protrusion 33d. A portion of the protrusion 33d is missing to define a pawl recess 33c which extends into the handle 33. A pawl member 35 fits into the pawl recess 33c, as shown in FIG. 4. The shaft member 32 extends through the central bore 33b of the handle 33, as shown in FIG. 4.

A gear member 36 has a disk-shape and an open hollow interior. A central indented aperture 36b is formed in the gear member 36, extending into the hollow interior. A plurality of gear teeth 36a are formed on the inner circumferential periphery of the gear member 36. As is shown in FIG. 4, the gear teeth 36a are configured to engage the pawl member 35. The upper notched shaft portion 32c extends into the central indented bore 36b of the gear member 36.

The upper notched shaft portion 32c is fixed to the gear member 36 by any of a variety of means. For instance, once inserted into the central indented bore 36b, the upper notched shaft portion 32c may be punched or deformed to restrain axial movement of the shaft member 32 with respect to the gear member 36. Alternatively, the shaft member 32 may be welded to the gear member 36. Further, the shaft member 32 may be press-fitted into the bore 36b. The shaft member 32 may alternatively be made of a non-metallic material, in which case the shaft member 32 may be glued or cemented to the disk member 31 or a bolt may extent therethrough to secure the various member to the shaft member 32.

The handle 33 and 34 are preferably made of a plastic material having good tensile and shear stress strength to withstand usage on a bicycle. The gear member 36, the shaft member 32 and the disk member 31 are preferably made of a metal material. The pawl member 35 is preferably made of plastic but may also be made of a metal material, such as steel.

The gear member 36 is preferably made of a metal material. For instance, the gear member 36 may be made from steel pressed plate material. Further, the gear member 36 may be formed with the gear teeth 36a extending 360° around the inner periphery, or alternatively, the gear member 36 may be formed with gear teeth extending 180° or less around the inner periphery. The number of gear teeth 36a is predetermined based upon the number of different gear ratios an associated gear ratio changing mechanism, such as a gear derailleur (not shown), is configured to accommodate. For instance, if the mechanism 30 is intended for use on a bicycle with 5 gears, the number of gear teeth 36a must allow for the lever arm 34 to move to five predetermined positions, the positions determined by the size, depth and spacing between each of the gear teeth 36a. The actual number of gear teeth 36a is also a function of the size of the pawl member 35.

Referring to FIG. 5, in use the gear changing mechanism 30 is connected to a cable C having an end E extending through the cable retaining hole 33a, such that the end E causes the cable C to be retained therein. The cable C also includes a shield S which is restrained against the cable shield retaining portion 31a so as not to move with respect to the disk member 31.

The gear changing mechanism 30 operates as follows. When the lever arm 34 is moved by a bicyclist, the disk member 31 is restrained from movement by a base (not shown) which secures the gear changing mechanism 30 to the frame or handlebar of a bicycle (not shown). As the lever arm 34 moves, at least one of the gear teeth 36a is engaged with the pawl member 35. The pawl member 35 pivots in the recess 33c and allows the gear member 36 to move a predetermined distance which corresponds to engagement of a portion of the pawl member 35 with another one of the gear teeth 36a. The engagement of the pawl 35 with the gear teeth 36a restricts the movement of the lever arm, and hence the connected cable C, to predetermined, incremental steps.

Figure 1:
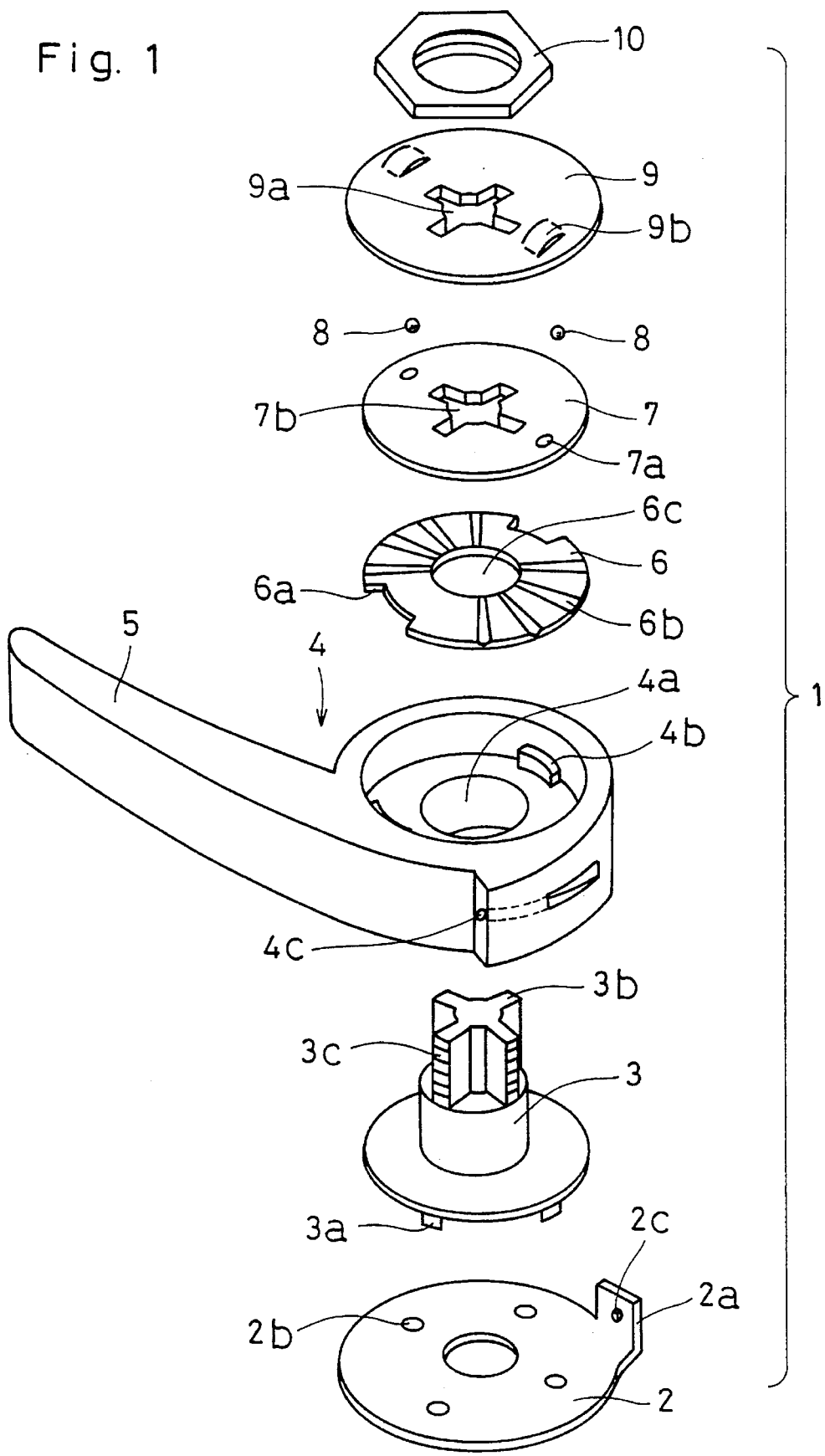
FIG. 1 is an exploded view of a prior art configuration of a gear shifting mechanism.

The gear changing mechanism 30 has a simple design and a reduced number of components when compared to the prior art mechanism depicted in FIG. 1 and the gear changing mechanism 20 depicted in FIG. 2. The simplified configuration allows for possible reductions in manufacturing costs and simplification of assembly.

The shaft member 32 of the gear changing mechanism 30 is preferably made from rolled plate steel. Therefore, the possible cost of manufacturing of the shaft member, compared to the prior art, is reduced and simplified.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed:

1. A gear shifting mechanism comprising:

a base member having a cable shield retaining portion;

a lever handle formed with a central aperture, a support portion and a pawl retaining recess;

a shaft member disposed in said central aperture, said shaft member fixed to said base member;

a gear member having a disk-like shape and a generally hollow interior having an inner circumferential surface with gear teeth formed thereon, said gear member fixed to said shaft member; and a pawl member disposed in said pawl retaining recess for engagement with said gear teeth.

2. The gear shifting mechanism as set forth in claim 1 wherein said lever handle is formed from a plastic material.

3. The gear shifting mechanism as set forth in claim 1 wherein said shaft member is made from plate steel deformed to form a hollow shaft.

4. The gear shifting mechanism as set forth in claim 1 wherein said gear member is formed from a steel plate material pressed to form the disk-like shape and said gear teeth.

5. The gear shifting mechanism as set forth in claim 1 wherein said pawl member is formed of a plastic material.

6. The gear shifting mechanism as set forth in claim 1 wherein said gear member and said base member confine said lever handle therebetween and permit said lever handle to rotate about said shaft member.

7. The gear shifting mechanism as set forth in claim 1 wherein said pawl member confines said lever handle to predetermined incremental movement about said shaft member.

8. The gear shifting mechanism as set forth in claim 1 wherein said shaft member is made from plate steel deformed to form a hollow shaft having notched ends, a first end of said hollow shaft shaped to engage said base member, and a second end of said hollow shaft shaped to engage said gear member.

\* \* \* \* \*